(12) United States Patent
Neisius et al.

(10) Patent No.: US 9,790,349 B2
(45) Date of Patent: Oct. 17, 2017

(54) FLAME RETARDANT WOOD PLASTIC COMPOSITE

(71) Applicant: SCHILL & SEILACHER GmbH, Böblingen (DE)

(72) Inventors: N. Matthias Neisius, Böblingen (DE); Ingmar E. Held, Böblingen (DE); Mike Mikolay, Marcedonia, OH (US); Zoran Bdraski, Copley, OH (US); Neal Kendall, Akron, OH (US); Hollie Kennedy, Hudson, OH (US)

( * ) Notice: Subject to any disclaimer, the term of this patent is extended or adjusted under 35 U.S.C. 154(b) by 76 days.

(21) Appl. No.: 14/541,884

(22) Filed: Nov. 14, 2014

(65) Prior Publication Data

US 2016/0137820 A1  May 19, 2016

(51) Int. Cl.
| | |
|---|---|
| *C08K 3/32* | (2006.01) |
| *C08K 11/00* | (2006.01) |
| *C08K 5/5357* | (2006.01) |
| *C08K 5/3492* | (2006.01) |

(52) U.S. Cl.
CPC .............. *C08K 11/00* (2013.01); *C08K 3/32* (2013.01); *C08K 5/34922* (2013.01); *C08K 5/5357* (2013.01); *C08K 2003/323* (2013.01)

(58) Field of Classification Search
CPC ....................................................... C08K 3/32
See application file for complete search history.

(56) References Cited

U.S. PATENT DOCUMENTS

| | | | |
|---|---|---|---|
| 2014/0114000 A1* | 4/2014 | Makinoshima .... | C08G 73/1078 524/116 |
| 2015/0072583 A1* | 3/2015 | Murata ................ | C08G 59/621 442/141 |

FOREIGN PATENT DOCUMENTS

| | | | |
|---|---|---|---|
| WO | WO 2004/111121 A1 | * | 12/2004 |
| WO | WO 2005/021848 A1 | * | 3/2005 |
| WO | WO 2005/100650 A1 | * | 10/2005 |

* cited by examiner

*Primary Examiner* — Robert Harlan
(74) *Attorney, Agent, or Firm* — McNees Wallace & Nurick LLC

(57) ABSTRACT

A wood plastic composite comprises a thermoplastic resin, a lignocellulosic filler, a flame retardant material in an amount of between 10 to 20 percent by weight, based on the total weight of the composite, and optionally other additives, wherein the flame retardant material comprises one or more compounds selected from the group of a cyclic organophosphorous compound and mixtures of the cyclic organophosphorous compound together with a nitrogen-containing organic compound, and optionally a minor amount of an inorganic flame retardant.

20 Claims, No Drawings

FLAME RETARDANT WOOD PLASTIC COMPOSITE

TECHNICAL FIELD

The present invention is related to wood plastic composites, and more specifically to wood plastic composites containing one or more flame retardants.

BACKGROUND OF THE INVENTION

Wood plastic composites (WPCs) represent a class of materials that are of great interest especially for construction and decorative application. Final products are for example decking boards for terraces or window and door frames. Wood plastic composites can be processed either by extrusion or injection molding. The majority of WPCs is prepared by extrusion of wood flour with thermoplastic resins such as polypropylene or polyethylene and optionally further additives.

One problem of wood plastic composites is their relatively high flammability as compared to normal untreated wood. The combination of wood flour with highly flammable polymers such as polyethylene and polypropylene worsens the fire performance and facilitates the ignitability of the compounded products. The application of fire retardant coatings to WPCs often fails because of adhesion problems between the coating and the polymeric material.

WPCs may contain additional ingredients that help maintaining the desired properties such as color, smoothness and processing characteristics. Therefore, it is also possible to use flame retardant additives when compounding the WPC material. A flame retardant additive is a chemical compound that helps reducing the ignitability and flame spread of a material. There numerous different flame retardant additives on the market based on different chemistries such as halogenated compounds, metal hydroxides, organic or inorganic phosphorus containing compounds and nitrogen-based compounds. As the WPC material is processed by extrusion the flame retardant additive must meet certain processing requirements such as thermal stability, inertness and compatibility with the polymer matrix.

A conference paper by Robert H. White, Nicole M. Stark and Nadir Ayrilmis, entitled "2011 Recent Advances in Flame Retardancy of Polymeric Materials", BCC Research, Wellesley, Mass., May 23-25, 2011, includes a comparison of WPC materials comprising different flame retardant additives such as ammonium polyphosphate, melamine phosphate, zinc borate, magnesium hydroxide and decabromodiphenyl oxide/antimony trioxide. It was found that fire retardants are effective in WPCs, but that the addition of fire retardant chemicals can also have a detrimental effect on mechanical and moisture resistance properties of WPCs.

Accordingly, there is still a big demand for wood plastic composites containing efficient flame retardants.

Wooden materials and polymers based on polyolefins are often coated or blended with an intumescent flame retardant formulation to meet fire safety standards. An intumescent coating is usually composed of an acid source such as a phosphoric acid derivative, a blowing agent such as a nitrogen-containing compound, and a charring agent such as an organic compound having an increased number of hydroxyl groups. In case of a fire or contact to the flame these compounds react with each other to form a voluminous bulky char that protects the substrate from heat and oxygen supply and thus prevents a flame spread.

Since wood flour is based on cellulose which is a polyhydroxy material capable of forming a char, intumescent flame retardants should also be suitable for use with WPCs. However, intumescent flame retardants are quite reactive formulations so that they can cause problems during processing of WPCs at elevated temperatures due to degradation of the polymer matrix.

SUMMARY OF THE INVENTION

It is an object of the present invention to provide an efficient flame retardant formulation for wood plastic composites.

It is another object of the invention to provide a WPC material containing a flame retardant which does not adversely affect the thermal processing of the wood plastic composite material, and which also does not influence the final properties of the WPC material such as color, strength, weather resistance and water uptake.

It is yet a further object of the present invention to provide an intumescent formulation that shows efficient flame retardant behavior in WPCs and is furthermore compatible with the extrusion process of WPCs.

This and other objects have been achieved according to the present invention by providing a wood plastic composite material comprising a thermoplastic resin, a lignocellulosic filler, and a halogen-free flame retardant material in an amount of between 5 to 20 weight percent, based on the total weight of the composite, and optionally one or more of a lubricant, a mineral filler and other additives, wherein the flame retardant material comprises at least one cyclic organophosporous compound alone or in combination with a nitrogen-based organic compound, and optionally a minor amount of an inorganic flame retardant.

The flame retardant material according to the invention is used in an effective amount which is the amount required to see a substantial flame retardant effect. The effective amount is measured by means of a fire test that is used for evaluation of flame retarding properties. The effective amount of the flame retardant material in the WPC may vary depending on the amount of the thermoplastic resin in the WPC. Usually, a higher amount of the thermoplastic resin requires a higher amount of the flame retardant material. The inventors contemplate that an amount of about 5 to 20 weight percent of the flame retardant will provide the required flame retardant effect in substantially all WPCs.

Preferably, the wood plastic composite comprises the thermoplastic resin and the flame retardant material in a weight ratio of from 10:1 to 1:1, preferably from 4:1 to 2:1.

The flame retardant wood plastic composites according to the invention are manufactured by means of known methods, for example by blending the lignocellulosic filler, the thermoplastic resin, the flame retardant material and optionally other additives using equipment such as calenders, mixers, kneaders and extruders. The additives may be added individually to the blend or mixed with one another and added to the blend as a mixture.

The present invention provides a flame retardant wood plastic composite that has an effective fire performance and at the same time does not affect the required mechanical properties of the WPC material such as flexural, tensile and impact properties and moisture resistance. In comparision with linear structures, it has been found that cyclic organophosphorous compounds provide a superior thermal stability and chemical inertness towards the lignocellulosic filler.

The flame retardant material of the present invention is considered as an intumescent system which is surprisingly able to withstand the processing conditions of wood plastic composites. In addition to the intumescent action, the cyclic organophosphorous compound can also exhibit a certain gas-phase inhibition action due to a facilitated formation of phosphoryl-radicals by P—C bond cleavage. Use of a halogen-free flame retardant guarantees that no hazardous or toxic products evolve from the WPC material in the case of a fire.

Moreover, the WPC of the present invention is resistant to leaching out of the organophosphorous compound due to watering, and the organophosphorous compound also does not interfere with the lubricant present in most of the commercial WPC materials.

According to a preferred embodiment, the flame retardant material comprises at least one cyclic organophosphorous compound represented by the following formula:

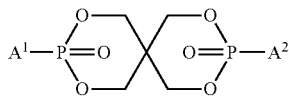

wherein $A^1$ and $A^2$ independently denote hydrogen, a hydroxy group, an amino group, a substituted or unsubstituted, straight or branched chain alkyl group having 1 to 4 carbon atoms, a substituted or unsubstituted benzyl group, a substituted or unsubstituted phenyl group, or a substituted or unsubstituted naphtyl group.

Preferably, the organophosphorous compound is an organophosphonate as represented by the above formula, wherein $A^1$ and $A^2$ independently denote hydrogen, a substituted or unsubstituted, straight or branched chain alkyl group having 1 to 4 carbon atoms, a substituted or unsubstituted benzyl group, a substituted or unsubstituted phenyl group, or a substituted or unsubstituted naphtyl group. More preferably, $A^1$ and $A^2$ independently denote at least one of methyl and ethyl.

According to another embodiment, the flame retardant material comprises the above cyclic organophosphorous compound, preferably the cyclic organophosphnate compound, and at least one nitrogen-containing organic compound wherein the nitrogen-containing compound is selected from the group consisting of 1,3,5-triazine, guanidine, urea and derivatives thereof, polymeric and oligomeric 1,3,5-triazine derivates, and mixtures thereof.

Preferably, the nitrogen-containing organic compound is a 1,3,5-triazine derivative selected from the group consisting of melamine and melamine salts, melam, melem, melon, ammeline, ammelide, 2-ureido melamine, and mixtures thereof.

More preferably, the nitrogen-containing compound is a melamine salt selected from the group consisting of melamine borate, melamine orthophosphate, melamine pyrophosphate, dimelamine pyrophosphate, melamine polyphosphate, melamin cyanurate, and mixtures thereof.

The nitrogen-containing compound preferably acts as a blowing agent in intumescent flame retardants.

According to some embodiments of the present invention, the flame retardant material may also comprise a minor amount of an inorganic flame retardant such as ammonium polyphosphate and other polyphosphates, aluminum trihydroxide, magnesium dihydroxide, Boehmite, Huntite, zinc stannate, zinc hydroxy stannate and nanoclays, as well as mixtures thereof.

A "minor amount" denotes that the wood plastic composite comprises the inorganic flame retardant in an amount that does not exceed the total amount of the organophosphorous compound and the organic nitrogen-containing compound.

According to a preferred embodiment, the flame retardant consists of the at least one cyclic organophosphorous compound. In this embodiment, the at least one cyclic organophosphorous compound is preferably present in an amount of from about 10 to 15 weight percent, based on the total weight of the wood plastic composite. Preferably, the organophosphorous compound is an organophosphonate as defined above.

According to another preferred embodiment, the flame retardant consists of a mixture of the at least one cyclic organophosphorous compound and the at least one nitrogen-containing compound.

When admixed with the nitrogen-containing organic compound, the at least one cyclic organophosphorous compound is present in the wood plastic composite preferably in an amount of from about 2 to 15 weight percent, more preferably 3 to 10 or 5 to 10 weight percent, based on the total weight of the wood plastic composite.

The at least one nitrogen-containing compound is present in the wood plastic composite preferably in an amount of from about 2 to 10 weight percent, more preferably 3 to 10 or 5 to 10 weight percent, based on the total weight of the wood plastic composite.

More preferably, the weight ratio of the at least one nitrogen-containing compound and the at least one cyclic organophosphorous compound is in a range of from 1:10 to 10:1, preferably 1:5 to 5:1, or 1:4 to 4:1, more preferably 1:3 to 3:1 or 1:2 to 2:1.

Also in this embodiment, the cyclic organophosphorous compound preferably is an organophosphonate as defined above.

DESCRIPTION OF PREFERRED EMBODIMENTS

The wood plastic composite of the present invention comprises a thermoplastic resin, a lignocellulosic filler, for example in the form of particles, chips and/or fibers, a flame retardant material and optionally one or more of a lubricant, a mineral filler and other additives. The thermoplastic resin and the lignocellulosic filler material may be obtained through recycling.

The thermoplastic resin is not particularly limited. Preferred thermoplastic resins include polyamides and polyolefins such as polyethylene, preferably HDPE, polypropylene, preferably isotactic polypropylene; polyvinyl chloride, polystyrene, acrylonitrile-butadiene-styrene and/or melamine resin. The thermoplastic resin may be functionalized with functional groups or may not contain any functional groups. Functional groups are, for example hydroxyl groups or carboxyl groups. The thermoplastic resin can be a homopolymer, copolymer, or block copolymer. One or more types of thermoplastic resin may be used as a mixture.

Preferably, the amount of the thermoplastic resin is in the order of 5 to 90% by weight, based on the weight of the composite, including all subvalues, preferably 5 to 70% by weight, more preferably 25 to 70% by weight, even more preferably 35 to 65% by weight, or 55 to 65% by weight.

The lignocellulosic filler is preferably wood, more preferably in the form of wood fiber, wood turnings, wood chips and/or wood flour. Any wood or combinations of wood can be used. The shape of the filler is not particularly limited as long as it can be combined with the thermoplastic resin. Examples are particles, chips, strips and/or fibers.

The amount of the lignocellulosic filler preferably is in the order of 10 to 95% by weight based on the weight of the composite, including all subvalues, preferably 30 to 95% by weight, more preferably 30 to 75% by weight, even more preferably 35 to 65% by weight or 35 to 45 percent by weight. The moisture content of the filler can be 0.1 to 10% by weight, based on the weight of the filler.

Preferably, the lignocellulosic filler comprises or consists of wood flour. The wood flour is not particularly limited. However, a wood flour having a fine particles size in the order of 10 to 100 mesh (U.S. sieve size), including all subvalues, preferably 20-60 mesh, from any wood, preferably from oak, pine or maple wood can be used. One or more types wood floor can be used.

Further, wood fibers, wood chips, wood turnings and wood particles from any wood can be used, alone or in combination with each other or with wood flour. In addition, other lignocellulosic materials may be used instead of or in a blend with the wood flour, fibers and/or particles or other forms of wood.

Especially useful other lignocellulosic materials are agricultural fibers such as flax, jute, kenaf and hemp, agricultural residues such as corn stalks, rice hulls and coconut coir, recycled paper and paper sludge.

The other additives, apart from flame retardant materials, are not particularly limited and are chosen depending on the intended application. Preferred additives include coupling agents, lubricants, stabilizers such as heat and light stabilizers, mineral fillers, biocides, colorants and foaming agents. One or more additives can be used. One or more types of a particular additive can be used. The total amount of the other additives in the WPC may range from 0 to about 40 weight percent.

Coupling agents are used in wood plastic composites to improve the interfacial bond between the hydrophilic wood flour and the hydrophobic thermoplastic resin. Currently, the coupling agents used in wood-plastic composites include maleated polyolefins (i.e maleic anhydride grafted polyethylene or polypropylene) and organosilanes such as vinylsilanes and vinyl oligomeric silanes.

The lubricant helps to lower the viscosity of the thermoplastic resins and to eliminate tackiness during extrusion, thereby improving surface appearance and increasing production rate of the WPC. Useful internal lubricants are miscible with the polymer matrix, reduce the viscosity of the polymer and lower shear heating. Examples for internal lubricants used in WPCs are fatty acid esters and fatty alcohols. Useful external lubricants are non-soluble in the polymer matrix, but improve the slip between the extrusion die and the melt blend. Examples for external lubricants are metal soaps, surfactants, paraffins, low molecular weight polyethylene, and polyethylene waxes. Preferably, the lubricant is present in an amount of up to 10 weight percent, preferably 3 to 7 weight percent, based on the total weight of the composite.

Typical mineral fillers are selected from the group consisting of talc, calcium carbonate, calcium sulfate, and mica. Mineral fillers are used for improving heat stabilization and reinforcement, and for increasing water resistance and stiffness of the WPCs. It is to be understood that inorganic metal hydroxides such as aluminium trihydroxide and magnesium hydroxide are not considered to be a mineral filler while they may act as inorganic flame retardants. Preferably, the mineral filler is present in an amount of up to 20 weight percent, more preferably 5 to 10 weight percent, based on based on the total weight of the composite.

Pigments and dyes are used in WPCs for providing the desired aesthetic appearance and also for minimizing UV detorization. Useful pigments and dyes include, but are not limited to, carbon black, iron oxide, titanium dioxide, and organic pigments.

Biocides in WPCs prevent microbial growth as well as the growth of fungi and algae, especially in outdoor applications. Useful biocides include but are not limited to zinc borate, bethoxazin, isothiazolone, carbamate derivatives, and thiabendazol.

According to a preferred embodiment of the present invention, the flame retardant material consists of the at least one cyclic organophosphorous compound, or a mixture of the at least one cyclic organophosphorous compound and at least one nitrogen-containing compound. More preferably, the at least one cyclic organophosphorous compound is a cyclic organophosphonate, as defined above.

The at least one cyclic organophosphorous compound is present in the wood plastic composite preferably in an amount of from about 5 to 15 weight percent, based on the total weight of the wood plastic composite.

The at least one nitrogen-containing compound is present in the wood plastic composite preferably in an amount of from about 5 to 10 weight percent, based on the total weight of the wood plastic composite.

More preferably, the weight ratio of the at least one nitrogen-containing compound and the at least one cyclic organophosphorous compound is in a range of from 1:10 to 10:1, including any subranges.

The at least one cyclic organophosphorous compound preferably is represented by the following formula:

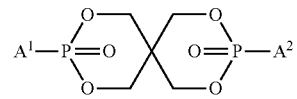

wherein $A^1$ and $A^2$ independently denote hydrogen, a hydroxy group, an amino group, a substituted or unsubstituted, straight or branched chain alkyl group having 1 to 4 carbon atoms, a substituted or unsubstituted benzyl group, a substituted or unsubstituted phenyl group, or a substituted or unsubstituted naphtyl group. Preferably, the cyclic organophosphorous compound is an organophosphonate, and more preferably $A^1$ and $A^2$ independently denote methyl or ethyl.

The nitrogen-containing compound preferably is selected from the group consisting of 1,3,5-triazine, guanidine, urea and derivatives thereof, polymeric and oligomeric 1,3,5-triazine derivates, and mixtures thereof.

More preferably, the nitrogen-containing compound is a 1,3,5-triazine derivative selected from the group consisting of melamine and melamine salts, melam, melem, melon, ammeline, ammelide, 2-ureido melamine, and mixtures thereof.

Useful examples for melamine salts include but are not limited to melamine borate, melamine orthophosphate, melamine pyrophosphate, dimelamine pyrophosphate, melamine polyphosphate, melamin cyanurate, and mixtures thereof.

In some embodiments, the flame retardant may further comprise a minor amount of an inorganic flame retardant, wherein the amount of the inorganic flame retardant does not exceed the total amount of the organophosphorous compound and the organic nitrogen-containing compound.

More preferably, the inorganic flame retardant is selected from the group consisting of polyphosphates such as ammonium polyphosphate, aluminum trihydroxide, magnesium dihydroxide, Boehmite, Huntite, zinc stannate, zinc hydroxy stannate, nanoclays, and mixtures thereof.

A particularly preferred wood plastic composite of the present invention consist of the following:

35 to 60 weight percent of a thermoplastic resin, preferably a polyolefin such as at least one of polyethylene and polypropylene;

30 to 65 weight percent of a lignosellulosic filler, more preferably 35 to 45 weight percent, wherein the lignocellulosic filler preferably comprises wood flour having an average particle size in the range of from 10 to 100 mesh, more preferably 20 to 60 mesh (U.S. sieve size);

10 to 20 weight percent of a flame retardant material, wherein the flame retardant material is selected from the group of cyclic organophosphorous compounds and cyclic organophosphorous compounds admixed with a nitrogen-containing organic compound, and optionally a minor amount of an inorganic flame retardant; and 0 to 10 weight percent of a lubricant, preferably 3 to 7 weight percent;

0 to 20 weight percent of a mineral filler, preferably 5 to 10 weight percent;

0 to 10 weight percent of other additives, each based on the total weight of the wood plastic composite.

Preferably, the cyclic organophosphorous compound is an organophosphonate, as defined above.

The WPCs of the present invention are preferably manufactured by extrusion, compression molding or injection molding. However, the method of manufacturing is not particularly limited. Any forming method may be applied.

Wood-plastic composites are widely used in applications such as decking, fencing, windows, doors, automotive and furniture, including but not limited to outdoor decks and fences, window and door profiles, spas, marina boardwalks, car paneling and truck flooring.

Having generally described this invention, a further understanding can be obtained by reference to certain specific examples which are provided herein for purposes of illustration only, and are not intended to be limiting unless otherwise specified.

EXAMPLES 1 to 12

Manufacture of Wood Plastic Composite Specimens

A predefined amount of high density polyethylene (HDPE) granules, wood flour and various additives were premixed and then manually added through a funnel to a Leistritz (27 mm) single screw extruder at a melt temperature of about 190° C. and a rotation speed at which a maximum of 50% of the torque was reached. With the help of a specific die, bar-like specimen were produced having a width of 1.2 cm and a height of 0.6 cm.

The flammability of these specimens was tested by means of a horizontal burn test where the length of the burned material and also the burn rate were recorded. The specimen was ignited three times with the help of a Bunsen burner.

The composition of the WPC specimens and the test results are summarized in the following Table 1. Examples 1 to 6 as well as Example 11 are comparison examples. Examples 7, 8, 9, 10 and 12 are in accordance with the present invention.

As can be seen from the results shown in Table 1 all comparison examples did not show a sufficient fire performance either with respect to appearance or flammability. On the other hand, inventive Examples 7, 8, 9, 10 and 12 each provide a good or even very good flame retardant effect as well as good appearance characteristics.

Therefore, it can be derived from the test results that a cyclic organophosporous compound such as a spirocyclic bis-alkylylphosphonate of the following formula

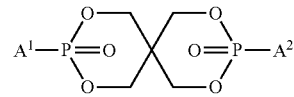

alone or in combination with melamine derivates, provides excellent flame retardant properties as well as good appearance properties to wood plastic composites at a loading of about 10 to 15 weight percent. The WPC specimens of examples 7, 8, 9 and 12 could not be ignited by a Bunsen burner even when tried for three times.

Numerous modifications and variations on the present invention are possible in light of the above teachings. It is therefore to be understood that within the scope of the appended claims, the invention may be practiced otherwise than as specifically described herein.

TABLE 1

| Formulation | HDPE | Wood | Talc | Lubricant | APP | APP | Zinc stannate | NOC | SOP | appearance | Ignition [x times] | Burn length [inch] | Burning rate [inch/min] |
|---|---|---|---|---|---|---|---|---|---|---|---|---|---|
| 1 | 40 | 50 | 10 | — | — | — | — | — | — | rough | 1 | completely | 1.14 |
| 2 | 35 | 50 | 10 | 5 | — | — | — | — | — | good | 1 | completely | 1.04 |
| 3 | 32 | 40 | 8 | 5 | 15 | — | — | — | — | rough, dark | 3 | | 0.25 |
| 4 | 32 | 40 | 8 | 5 | 10 | — | 5 | — | — | dark | 1 | completely | 0.69 |
| 5 | 32 | 40 | 8 | 5 | — | 10 | 5 | — | — | dark | 1 | completely | 0.65 |
| 6 | 32 | 40 | 8 | 5 | — | 15 | — | — | — | good | 1 | completely | 0.75 |
| 7 | 32 | 40 | 8 | 5 | — | — | — | 5 | 10 | good | — | — | — |
| 8 | 32 | 40 | 8 | 5 | — | — | — | 7.5 | 7.5 | good | — | — | — |
| 9 | 32 | 40 | 8 | 5 | — | — | — | 10 | 5 | good | — | — | — |
| 10 | 32 | 40 | 8 | 5 | — | — | 5 | 5 | 5 | good | 2 | 0.2 | 0.1 |
| 11 | 32 | 40 | 8 | 5 | — | — | 10 | — | 5 | good | 2 | completely | 0.81 |
| 12 | 32 | 40 | 8 | 5 | — | — | — | — | 15 | good | — | — | — |

SOP = Spirocyclic organophosphonate;
NOC = Nitrogen-containing organic compound;
APP = Ammonium polyphosphate.

The invention claimed is:

1. A wood plastic composite comprising a thermoplastic resin, a lignocellulosic filler, a flame retardant material in an amount of between 10 to 20 percent by weight, based on the total weight of the composite, wherein the flame retardant material comprises a cyclic organophosphorous.

2. The wood plastic composite of claim 1, wherein the cyclic organophosphorous compound is represented by the following formula selected from the group consisting of

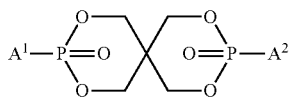

wherein $A^1$ and $A^2$ independently denote hydrogen, a hydroxy group, an amino group, a substituted or unsubstituted, straight or branched chain alkyl group having 1 to 4 carbon atoms, a substituted or unsubstituted benzyl group, a substituted or unsubstituted phenyl group, or a substituted or unsubstituted naphtyl group.

3. The wood plastic composite of claim 1, wherein the flame retardant material consists of the cyclic organophosphorous compound.

4. The wood plastic composite of claim 1, wherein the flame retardant material comprises a mixture of the cyclic organophosphorous compound and a nitrogen-containing organic compound.

5. The wood plastic composite of claim 4, wherein the nitrogen-containing compound is selected from the group consisting of 1,3,5-triazine, guanidine, urea and derivatives thereof, polymeric and oligomeric 1,3,5-triazine derivates, and mixtures thereof.

6. The wood plastic composite of claim 4, wherein the nitrogen-containing compound is a 1,3,5-triazine derivative selected from the group consisting of melamine and melamine salts, melam, melem, melon, ammeline, ammelide, 2-ureido melamine, and mixtures thereof.

7. The wood plastic composite of claim 4 wherein the nitrogen-containing compound is a melamine salt selected from the group consisting of melamine borate, melamine orthophosphate, melamine pyrophosphate, dimelamine pyrophosphate, melamine polyphosphate, melamin cyanurate, and mixtures thereof.

8. The wood plastic composite of claim 4, wherein said cyclic organophosphorous compound is present in an amount of from about 2 to 15 weight percent, based on the total weight of the wood plastic composite.

9. The wood plastic composite of claim 4, wherein said at least one nitrogen-containing compound is present in an amount of from about 2 to 10 weight percent, based on the total weight of the wood plastic composite.

10. The wood plastic composite of claim 4, wherein the weight ratio of said nitrogen-containing organic compound and said organophosphorous compound is in a range of from 1:10 to 10:1.

11. The wood plastic composite of claim 1, wherein said flame retardant material consists of said organophosphorous compound, and said organophosphorous compound is present in an amount of from about 10 to 15 weight percent, based on the total weight of the wood plastic composite.

12. The wood plastic composite of claim 1, wherein the lignocellulosic filler comprises wood flour.

13. The wood plastic composite of claim 12, wherein the wood flour has an average particle size of between 20 to 60 mesh.

14. The wood plastic composite of claim 1, wherein the composite comprises an additive selected from the group consisting of mineral fillers, lubricants, antioxidants, thermal stabilizers, pigments and dyes, coupling agents, photostabilizers, streakers, impact modifiers, foaming agents, biocides and fungicides, and mixtures thereof.

15. The wood plastic composite of claim 14, wherein the additive comprises a mineral filler selected from the group consisting of talc, calcium carbonate, calcium sulfate and mica.

16. The wood plastic composite of claim 1, wherein the additive comprises a lubricant selected from the group consisting of fatty acid esters, fatty alcohol, metal soaps, surfactants, paraffins, polyethylene waxes, and mixtures thereof.

17. The wood plastic composite of claim 1, wherein the composite consists of:
    35 to 60 weight percent of the thermoplastic resin;
    30 to 65 weight percent of the lignosellulosic filler, wherein the lignocellulosic filler comprises wood flour;
    10 to 20 weight percent of the flame retardant material; and
    0 to 10 weight percent of the lubricant;
    0 to 20 weight percent of the mineral filler;
    0 to 10 weight percent of the other additives, each based on the total weight of the wood plastic composite.

18. The wood plastic composite of claim 1, wherein the flame retardant material comprises a minor amount of an inorganic flame retardant.

19. A process for preparing a body of a wood plastic composite according to claim 1, comprising blending a mixture of said thermoplastic resin, said lignocellulosic filler, said flame retardant material, and optionally said lubricant, said mineral filler and said other additives, and extruding said mixture at a temperature above the melting point of said thermoplastic resin to form a molded body.

20. The wood plastic composite of claim 18 wherein the inorganic flame retardant is selected from the group consisting of polyphosphates, aluminum trihydroxide, magnesium dihydroxide, Boehmite, Huntite, zinc stannate, zinc hydroxy stannate, nanoclays, and mixtures thereof.

* * * * *